(12) United States Patent
McKenney et al.

(10) Patent No.: US 6,604,479 B2
(45) Date of Patent: Aug. 12, 2003

(54) AUTOPILOT-BASED STEERING AND MANEUVERING SYSTEM FOR BOATS

(75) Inventors: Shepard W. McKenney, Drayden, MD (US); Kenton D. Fadeley, Solomons, MD (US)

(73) Assignee: The Talaria Company, LLC, Boston, MA (US)

( * ) Notice: Subject to any disclaimer, the term of this patent is extended or adjusted under 35 U.S.C. 154(b) by 0 days.

(21) Appl. No.: 10/279,695

(22) Filed: Oct. 24, 2002

(65) Prior Publication Data

US 2003/0056707 A1 Mar. 27, 2003

Related U.S. Application Data

(63) Continuation of application No. 09/978,370, filed on Oct. 16, 2001, now abandoned, which is a continuation of application No. 09/803,202, filed on Mar. 9, 2001, now Pat. No. 6,308,651, which is a continuation of application No. 09/377,130, filed on Aug. 19, 1999, now Pat. No. 6,230,642.

(51) Int. Cl.[7] .............................................. B63H 25/00
(52) U.S. Cl. ...................... 114/144 R; 114/151; 440/40
(58) Field of Search ............... 114/144 R, 151; 440/38, 39, 40, 41, 42, 43

(56) References Cited

U.S. PATENT DOCUMENTS

| | | | |
|---|---|---|---|
| 3,409,252 A | 11/1968 | Miller | 244/83 |
| 3,675,611 A | 7/1972 | Glass | |
| 3,937,172 A | 2/1976 | Castoldi | 115/12 R |
| 3,942,464 A | 3/1976 | Schoell | 115/12 R |
| 3,976,023 A | 8/1976 | Noguchi et al. | 114/144 E |

(List continued on next page.)

FOREIGN PATENT DOCUMENTS

| | | |
|---|---|---|
| EP | 0 035 859 | 9/1981 |
| GB | 1561281 | 2/1980 |

OTHER PUBLICATIONS

Servo Commander—Single Drive Brochure, SKT/Styr–KontrollTeknik AB; BN Marin Elektronik, Sweden (1996).

Servo Commander—Dual Drive Brochure, SKT/Styr–KontrollTeknik AB; BN Marin Elektronik, Sweden (1996).

*Primary Examiner*—Stephen Avila
(74) *Attorney, Agent, or Firm*—Fish & Richardson P.C.

(57) ABSTRACT

A boat featuring an autopilot-based steering and maneuvering system. The steering system uses a specially integrated autopilot that remains engaged unless the operator is actively commanding the boat to change course. For example, in a boat in which steering is performed using a joystick, course changes can be effected simply by moving (e.g., twisting) the joystick. That movement automatically disengages the autopilot, allowing the operator to achieve the course change. When the operator has completed the course change and released the joystick, a centering spring returns it to a neutral position and the autopilot automatically reengages. In the improved maneuvering system, the autopilot is used for controlling the direction of a waterjet boat during very low speed (e.g., less than 4 knots) maneuvers, such as docking. The autopilot controls the steering system, e.g., rotation of the waterjet nozzle, to maintain a desired bow direction, while the operator uses a manual control device to apply a sideward force (e.g., from a bowthruster) to move the boat sideways. Preferably, a stick control device (e.g., a multi-axis joy stick) is used, and movement of the stick in a selected direction (sideways, fore and aft, or a combination) causes the boat to move in a corresponding direction, but with the direction of the bow maintained by the autopilot.

11 Claims, 6 Drawing Sheets

U.S. PATENT DOCUMENTS

| | | | | |
|---|---|---|---|---|
| 4,026,235 A | | 5/1977 | Woodfill | 115/12 R |
| 4,047,494 A | | 9/1977 | Scott | 115/12 R |
| 4,214,544 A | | 7/1980 | Dashew et al. | 114/151 |
| 4,220,111 A | | 9/1980 | Krautkremer et al. | 440/53 |
| 4,223,630 A | | 9/1980 | Keeney | 440/41 |
| 4,417,879 A | | 11/1983 | Kulischenko | 440/62 |
| 4,509,923 A | | 4/1985 | Turnbull | 440/43 |
| 4,519,335 A | | 5/1985 | Krautkremer et al. | 114/144 R |
| 4,691,659 A | * | 9/1987 | Ito et al. | 114/144 R |
| 4,747,359 A | | 5/1988 | Ueno | 114/144 B |
| 4,748,928 A | | 6/1988 | Nakamura | 114/144 R |
| 4,915,049 A | | 4/1990 | Nakamura | 114/144 R |
| 4,962,717 A | | 10/1990 | Tsumiyama | 114/144 R |
| 4,992,065 A | | 2/1991 | Torneman et al. | 440/41 |
| 4,996,937 A | | 3/1991 | Niina et al. | 114/144 R |
| 5,031,561 A | | 7/1991 | Nilsson | 114/144 R |
| 5,050,518 A | * | 9/1991 | Okita | 114/144 R |
| 5,090,929 A | | 2/1992 | Rieben | 440/40 |
| 5,107,424 A | * | 4/1992 | Bird et al. | 114/144 E |
| 5,116,180 A | | 5/1992 | Fung et al. | 414/5 |
| 5,129,846 A | | 7/1992 | Dimijian | 440/40 |
| 5,235,927 A | * | 8/1993 | Singh et al. | 114/144 E |
| 5,240,444 A | | 8/1993 | Kobayashi et al. | 440/41 |
| 5,344,344 A | | 9/1994 | Forsstrom | 440/41 |
| 5,361,717 A | | 11/1994 | Kobayashi | 114/361 |
| 5,362,269 A | | 11/1994 | Leach | 441/65 |
| 5,395,272 A | | 3/1995 | Smith | 440/42 |
| 5,540,174 A | | 7/1996 | Kishi et al. | 114/291 |
| 5,603,644 A | | 2/1997 | Kobayashi et al. | 440/86 |
| 5,664,978 A | | 9/1997 | Howe | 440/75 |
| 5,707,264 A | | 1/1998 | Kobayashi et al. | 440/86 |
| 6,230,642 B1 | * | 5/2001 | McKenney | 114/150 |
| 6,308,651 B2 | * | 10/2001 | McKenney et al. | 114/144 R |

\* cited by examiner

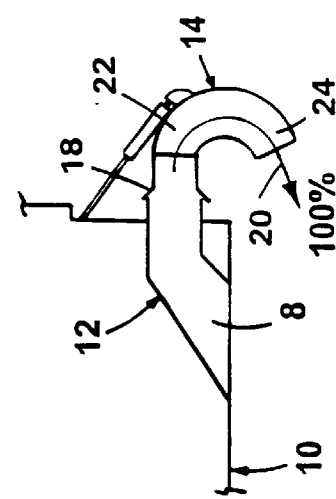
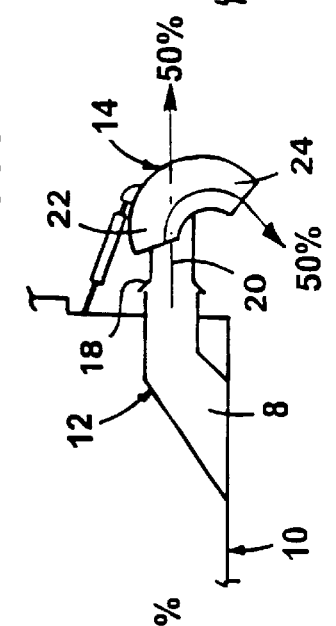
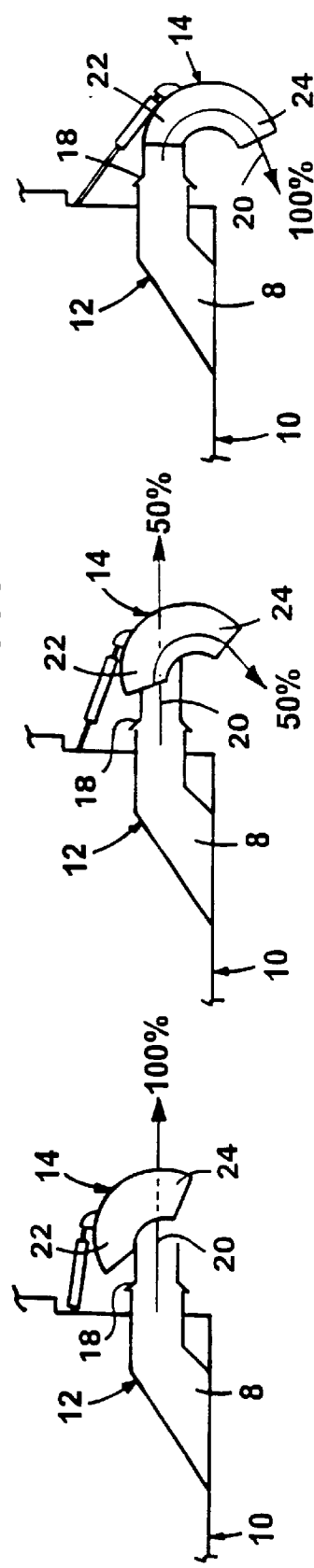
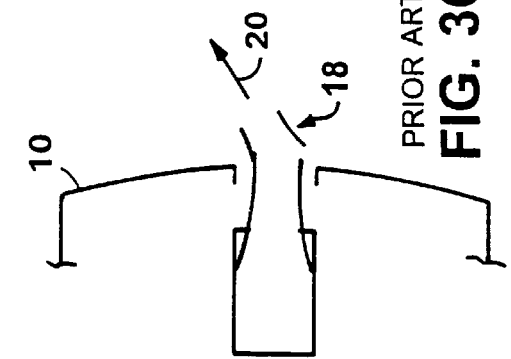
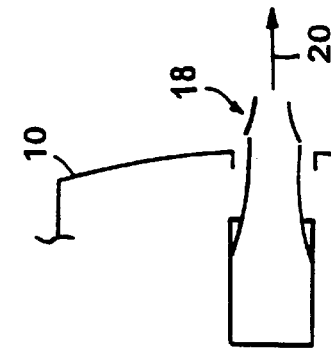
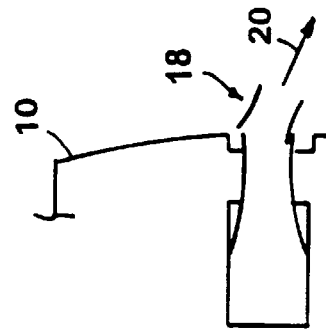

AUTOPILOT-BASED STEERING AND MANEUVERING SYSTEM FOR BOATS

CROSS-REFERENCE TO RELATED APPLICATIONS

This application is a continuation application of and claims priority to U.S. application Ser. No. 09/978,370, now abandoned which is a continuation application of and claims priority to U.S. application Ser. No. 09/803,202, filed on Mar. 9, 2001 now U.S. Pat. No. 6,308,651, which is a continuation application of and claims priority to U.S. application Ser. No. 09/377,130, filed on Aug. 19, 1999, now U.S. Pat. No. 6,230,642, issued on May 15, 2001.

BACKGROUND OF THE INVENTION

The invention relates to steering systems for boats, e.g., waterjet driven boats.

Waterjet boats are propelled by drawing a stream of water through a channel in the bottom of the boat and ejecting the stream out the back of the boat. A typical waterjet has two steering components: a nozzle and a reversing bucket. The nozzle is a tubular element near the rear of the propulsion stream ("the jet") that rotates from side to side. Rotating the nozzle deflects the exiting stream, imparting a side component to the propulsion vector, thereby turning the boat to port (left) or to starboard (right). A nozzle in a waterjet boat essentially serves the same purpose as a rudder in a propeller driven boat.

The reversing bucket allows an operator to slow or back up the boat. The bucket is a curved element located at the aftmost portion of the jet, just behind the nozzle. Ordinarily, the bucket is elevated above the jet, and has no effect on the operation of the boat. When the bucket is lowered over the jet, it blocks the jet and reverses its direction, causing the boat to move backwards. If the bucket is only partially lowered, it reverses some of the jet, thereby reducing the forward thrust, but does not reverse the direction of the boat's motion. If the bucket is lowered to reverse approximately half of the jet, then a balance point is achieved, and forward thrust of the boat is eliminated.

Some waterjet boats also have a third steering element, called a bowthruster, for side to side movement at low speed. The bowthruster is typically a tube that runs laterally across the boat near the bow, below the waterline. A reversible propeller in the middle of the tube can thrust the boat in either sideways direction.

Waterjet boats have a number of advantages over traditional propeller driven boats, including reduced noise and low draft. Waterjet boats, however, can be notoriously difficult to control, particularly at low speeds, e.g., when docking. In prior art waterjet boats, maintaining a heading and adjusting course, particularly at very low speed, requires considerable training, especially for operators accustomed to traditional propeller boats.

To facilitate steering of boats in the open sea, some boats include autopilots. The autopilot, when activated by an operator, maintains the boat's current course. Some propeller boats also include a detent structure to lock in a boat's course. In these boats, the steering wheel includes a notch or a groove, and the mechanism steered by the wheel includes a corresponding notch or groove. When the pilot returns the wheel to a neutral position, the corresponding notch and groove engage, holding the wheel in the neutral position. In certain boats, the autopilot automatically engages when the pilot returns the wheel to the neutral position and the corresponding notch and groove engage.

SUMMARY OF THE INVENTION

We have discovered new ways to use an autopilot to both steer and maneuver a boat, particularly a waterjet boat.

In the improved steering system, a specially integrated autopilot remains engaged unless the operator is actively commanding the boat to change course. The operator need not constantly engage and disengage the autopilot, as is necessary with a conventional system. For example, in a boat in which steering is performed using a joystick, course changes can be effected simply by moving (e.g., twisting) the joystick. That movement automatically disengages the autopilot, allowing the operator to achieve the course change. When the operator has completed the course change and released the joystick, a centering spring returns it to a neutral position and the autopilot automatically reengages.

The new steering system is simpler to use than conventional systems as the operator does not have to be concerned with manually disengaging and then re-engaging the autopilot. The autopilot functions in the background without the operator ordinarily needing to give it any attention. The system is also safer, as an instinctive steering correction to avoid an obstacle will immediately disengage the autopilot.

In the improved maneuvering system, the autopilot is used for controlling the direction of a waterjet boat during very low speed (e.g., less than 4 knots) maneuvers, such as docking. The autopilot controls the steering system, e.g., rotation of the waterjet nozzle, to maintain a desired bow direction, while the operator uses a manual control device to apply a sideward force (e.g., from a bowthruster) to move the boat sideways. Preferably, a stick control device (e.g., a multi-axis joy stick) is used, and movement of the stick in a selected direction (sideways, fore and aft, or a combination) causes the boat to move in a corresponding direction, but with the direction of the bow maintained by the autopilot.

This new maneuvering system makes it possible for even a novice operator to easily maneuver a waterjet boat in close quarters. The unsettling effects of wind and tide on the direction of the boat are automatically compensated for by the autopilot. And the operator is able to move the boat in and out of a slip, or to and from a dock, simply by making intuitive movements of a stick control device.

In this maneuvering mode, the autopilot's P factor (number of degrees of nozzle rotation for each degree of sensed heading error) is preferably set higher than would be used when the boat is underway. For example, P factors greater than 4 (and more preferably greater than 6) have been found to work successfully on a 35 foot Hinckley Picnic Boat powered by a single waterjet drive.

A simple and effective implementation of this maneuvering system is to use a bow thruster to apply sideward force in response to operator movement of the stick control device. The bow thruster initially changes the direction of the bow, but the autopilot quickly corrects the directional error by producing a compensating rotation of the waterjet nozzle.

Used in combination, the steering and maneuvering aspects of the invention make it possible to leave an autopilot constantly on, from first turning on a boat in a slip to driving the boat at high speed on open water. The new steering system works well in combination with the new maneuvering system, as if directional changes are desired during very low speed maneuvers, the operator simply moves the control device in the manner required to make a course change (e.g., twisting a joystick), and then resumes the intuitive maneuvering movements, as the autopilot will then maintain the new boat direction.

Embodiments of the invention may include one or more of the following features. The boat may be a waterjet boat, e.g., a waterjet boat less than 75 feet in length. The stick control member may be configured to rotate to the left and to the right about a generally vertical axis; rotating the stick control member to the left steers the boat to port, and rotating the stick control member to the right steers the boat to starboard. The stick control member may be biased to a neutral zero rotation position by a centering torque provided, e.g., by a spring, so that when the operator releases the stick control member, the centering torque returns the stick control member to its neutral position. The autopilot may be configured to always be engaged when the stick control member is in its neutral position.

Other features and advantages of the invention will be apparent from the following description of the preferred embodiments, and from the claims.

BRIEF DESCRIPTION OF THE DRAWING

FIGS. 2A–2C are enlarged, diagrammatic, elevation views of the waterjet drive of FIG. 1A, showing a reversing bucket in three different positions.

FIG. 3A–3C are enlarged, diagrammatic, plan views of the waterjet drive of FIG. 1A, with the reversing bucket in maximum forward thrust position, and a nozzle in three different positions.

DESCRIPTION OF THE PREFERRED EMBODIMENTS

In a preferred embodiment, the invention features a boat having a waterjet drive and bowthruster, a joystick control device, and an autopilot. The autopilot is specially integrated into the boat's control circuitry, allowing the autopilot to automatically control the boat's course unless the operator is actively commanding a change in course.

The Waterjet Drive

Figure 1A:
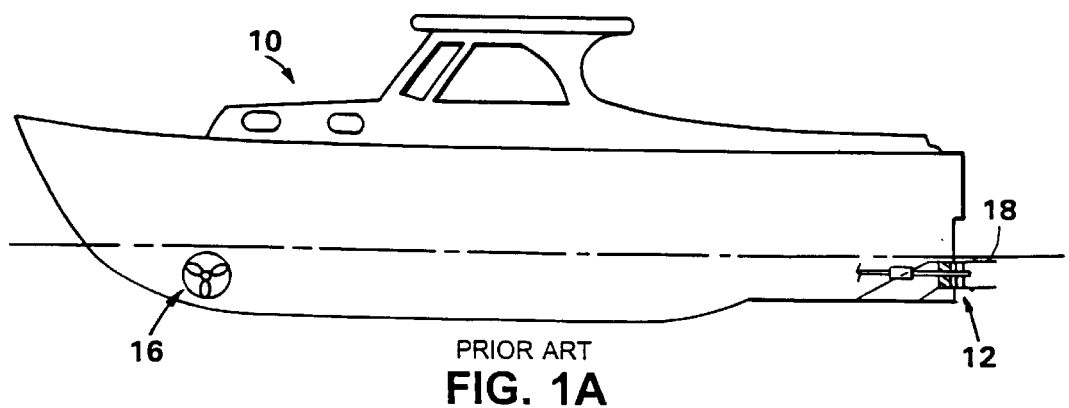
FIG. 1A is an elevation view of a prior art boat equipped with a waterjet drive and a bowthruster.
Figure 1B:
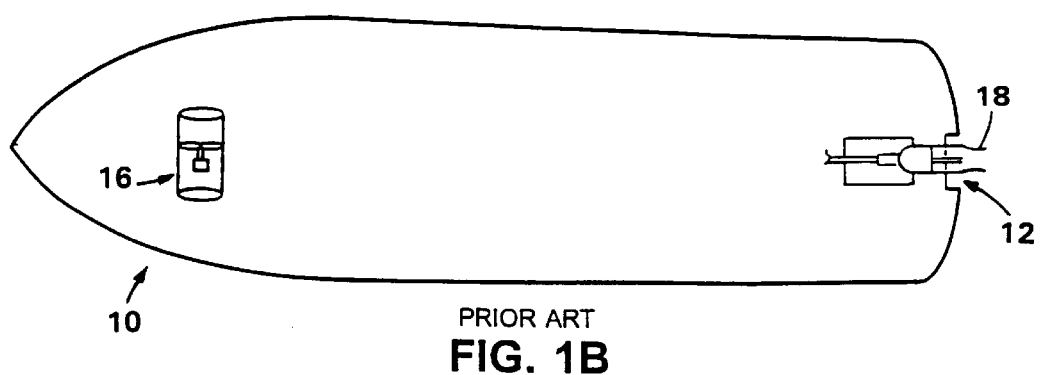
FIG. 1B is a plan view of the prior art boat of FIG. 1A.

Referring to FIGS. 1A and 1B, a boat 10 includes a waterjet drive 12 and a bowthruster 16.

Referring to FIGS. 2A–2C, drive 12 includes an inlet 8, a nozzle 18, and a reversing bucket 14. Water jet 20 enters through inlet 8 and exits through nozzle 18.

FIGS. 2A–2C illustrate the structure and operation of reversing bucket 14. Bucket 14 includes a bucket inlet 22 and a bucket outlet 24. Water from jet 20 which enters bucket inlet 22 is "reversed," and flows out bucket outlet 24 in the opposite direction.

FIG. 2A illustrates bucket 14 in its fully elevated, maximum forward thrust position. In the maximum forward thrust position, bucket inlet 22 remains above jet 20, and does not affect flow of the jet. FIG. 2B shows bucket 14 in its neutral position. In the neutral position, approximately half of jet 20 enters bucket inlet 22 and exits bucket outlet 24 in the reverse direction, such that forward and reverse thrust are approximately equal. FIG. 2C shows bucket 14 in its fully engaged, maximum reverse thrust position. In this reverse thrust position, all of jet 20 enters bucket inlet 22 and is reversed by bucket 14, causing boat 10 to move in reverse.

Figure 5:
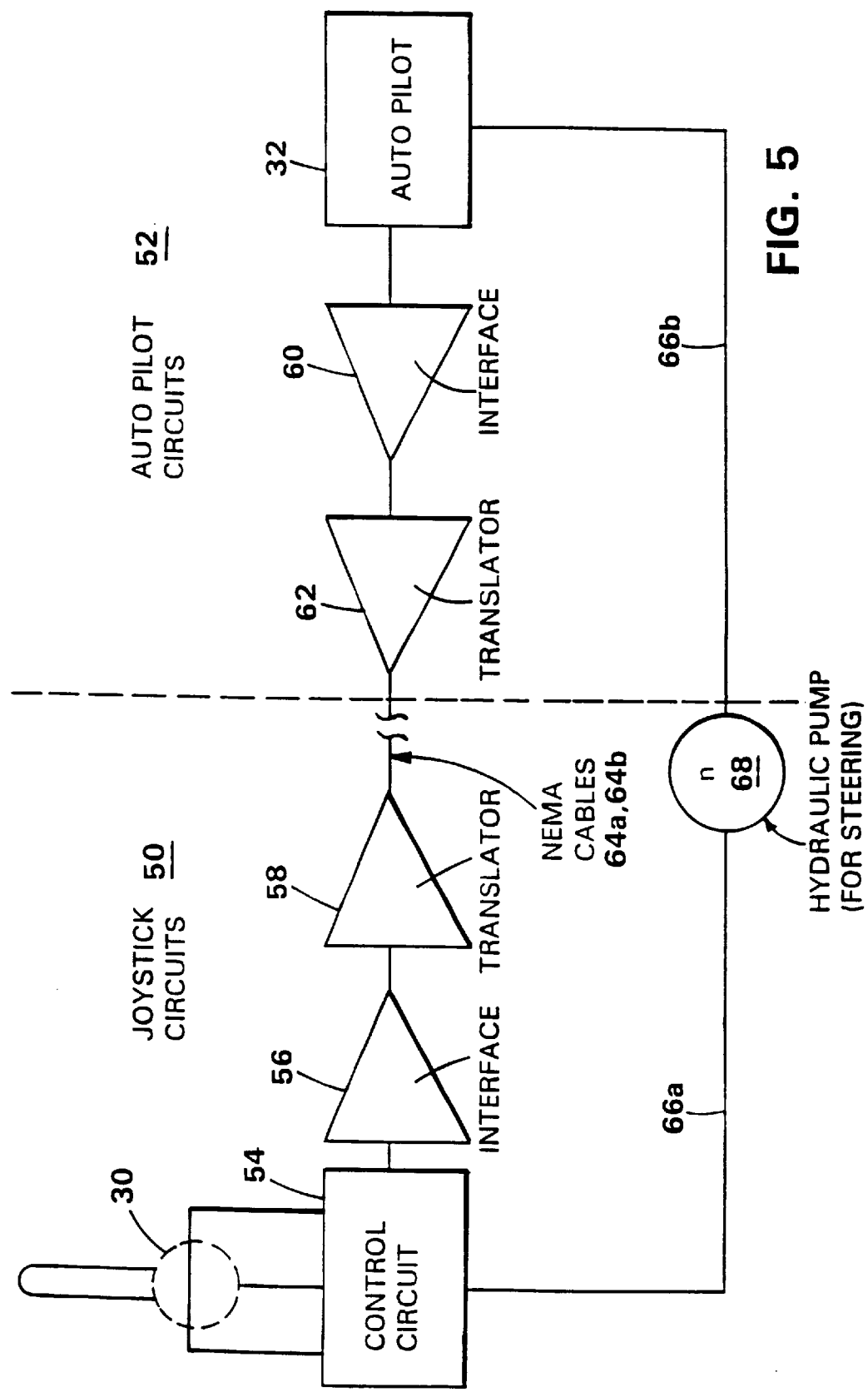
FIG. 5 is a schematic illustrating communication between the joystick of FIG. 4A and the autopilot of FIG. 4B.

FIGS. 3A–3F illustrate the operation of nozzle 18. Rotation of nozzle 18 in a horizontal plane about a generally vertical axis (not shown) alters the flow direction of exiting jet 20 along the plane of the water, changing the "sideways" component of the thrust vector acting on boat 10. Rotation of nozzle 18, therefore, steers boat 10 to port (left) or to starboard (right). A hydraulic pump 68 physically rotates nozzle 18, in response to commands from a control circuit (FIG. 5).

FIGS. 3A–3C show nozzle 18 in three different angular positions for the case in which reversing bucket 14 is in its fully elevated, maximum forward thrust position. (Bucket 14 does not appear in FIGS. 3A–3C because it is elevated above jet 20.) Positioning nozzle 18 as shown in FIG. 3A results in left sideways thrust for boat 10, positioning nozzle 18 as shown in FIG. 3B results in straight movement (zero sideways thrust), and positioning nozzle 18 as shown in FIG. 3C results in right sideways thrust.

Figure 3F:
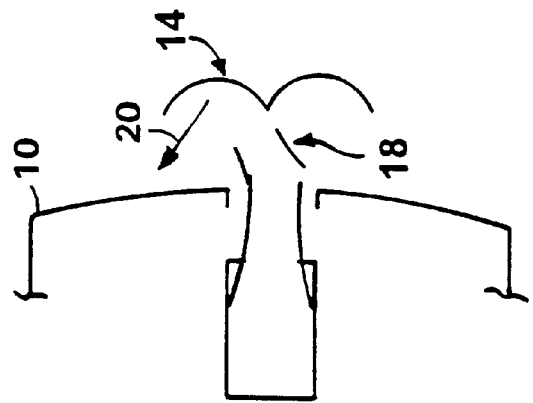
FIGS. 3D–3F are enlarged, diagrammatic, plan views of the waterjet drive of FIG. 1A, with the reversing bucket in maximum reverse thrust position, and the nozzle in three different positions.
Figure 3E:
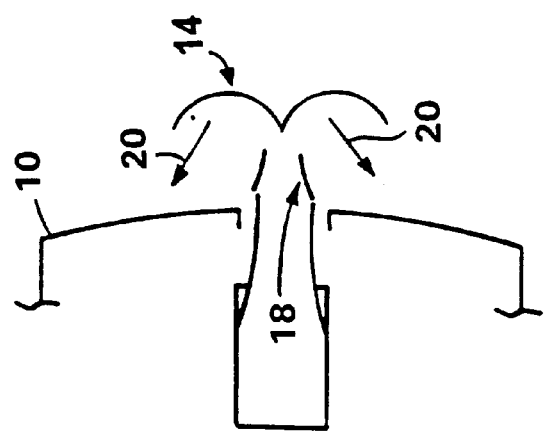
Figure 3D:
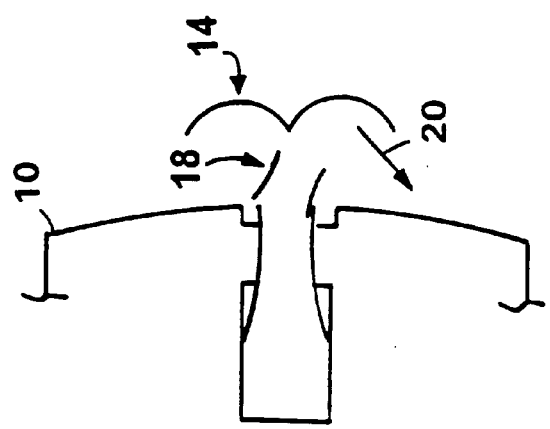

FIGS. 3D–3F show nozzle 18 in the same three angular positions for the case in which bucket 14 is in its fully engaged, maximum reverse thrust position. With bucket 14 and nozzle 18 positioned as shown in FIG. 3D, boat 10 will move in reverse, with a left sideways thrust; with the bucket 14 and nozzle 18 positioned as shown in FIG. 3E, boat 10 will move in reverse, with no sideways thrust; and with bucket 14 and nozzle 18 positioned as shown in FIG. 3F, boat 10 will move in reverse, with a right sideways thrust.

The Joystick and Automatic Pilot Controls

Boat 10 is controlled using a joystick and a specially integrated autopilot.

Figure 4A:
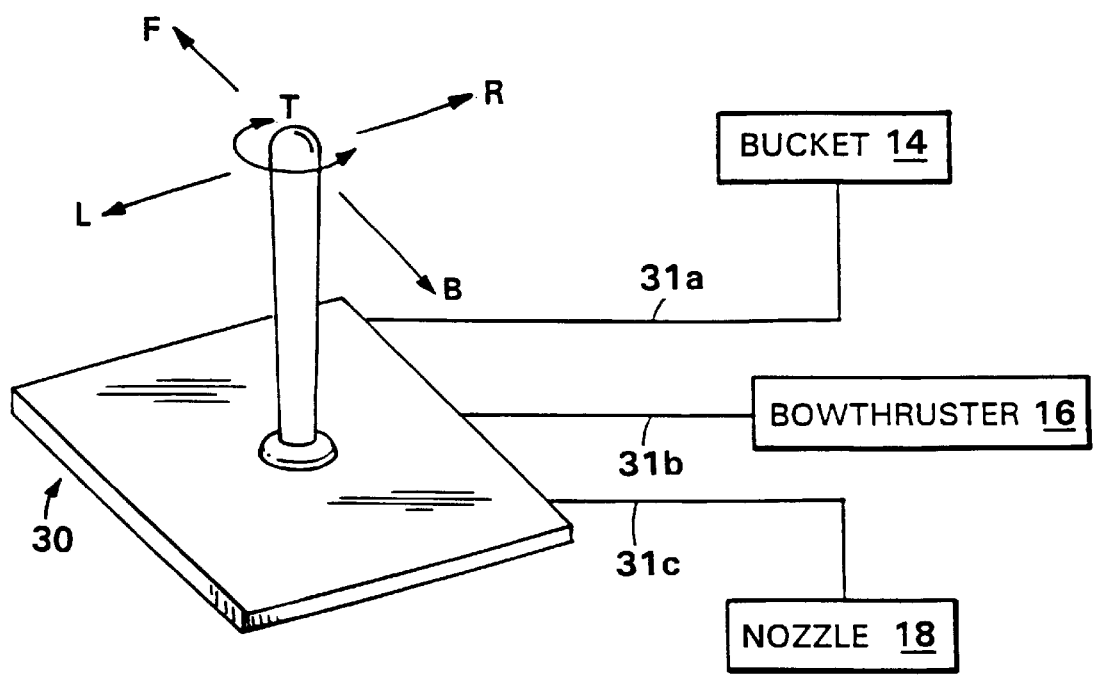
FIG. 4A is a partially diagrammatic, partially schematic view of a joystick used for steering the reversing bucket, nozzle, and bowthruster of the boat of FIG. 1A.

Referring to FIG. 4A, a joystick 30 is coupled by electrical circuitry 31a, 31b, and 31c to bucket 14, bowthruster 16, and nozzle 18, respectively. Moving joystick 30 in the forward and reverse directions (the directions of arrows F and B) raises or lowers bucket 14, altering the forward or reverse thrust of boat 10. Moving joystick to the left or to the right (in the directions of arrows L and R) engages bowthruster 16, moving boat 10 to the left or the right. Bowthruster 16 is generally only used at low speeds. Twisting joystick 30 in the directions of arrow T turns nozzle 18, steering boat 10 to the left or to the right. Centering forces (or centering torque, in the case of rotation) provided, e.g., by springs, bias joystick 30 to its neutral positions. The structure, operation, and electrical circuitry of joystick 30 are described in detail in U.S. patent application Ser. No. 09/146,596, entitled "Stick Control System for Waterjet Boats," filed Sep. 3, 1998, and incorporated herein by reference in its entirety.

Figure 4B:
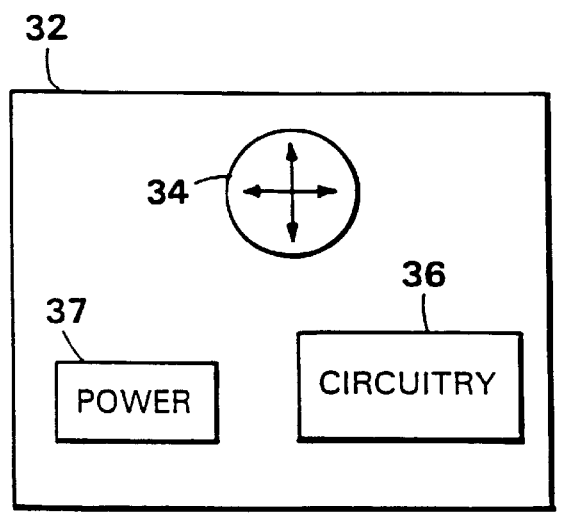
FIG. 4B is a schematic view of an autopilot used in a preferred embodiment of the invention.

Referring to FIG. 4B, an autopilot 32 includes a compass 34 and electrical circuitry 36. When autopilot 32 is engaged, it acts to maintain the course of boat 10 in the direction of the current reading of compass 34. Autopilot 32 can be, e.g., a Robertson autopilot, such as the Robertson AP20, with modified software and circuitry, as described below with reference to FIG. 5.

At a given moment, nozzle 18 is controlled by either joystick 30 or autopilot 32, but not both. Autopilot 32 controls nozzle 18 whenever joystick 32 is in its neutral, "un-torqued" position, and joystick 30 controls nozzle 18 whenever nozzle 18 is twisted by an operator.

FIG. 5 schematically illustrates communication between joystick 30 and the modified Robertson autopilot 32. FIG. 5 is divided into two sides: the joystick circuitry 50 and the autopilot circuitry 52. Joystick circuitry 50 includes control circuit 54, a joystick circuit interface 56, and a NEMA translator 58. ("NEMA" stands for National Electrical Marine Association. NEMA is a uniform wiring and data code standard.) NEMA translator 58 translates NEMA command sentences received from autopilot 32 into the language of control circuit 54, and also translates commands issued by control circuit 54 into NEMA. Joystick control circuit 54 connects to joystick 30 via a translator 59. Translator 59 translates movement of joystick 30 into electrical commands understood by control circuit 54.

Joystick circuitry 50 is located on two printed circuit boards within a single electronics enclosure. Control circuit 54 is located on a main printed circuit board, and interface 56 and translator 58 are located on an auxiliary board. Alternatively, interface 56 and translator 58 can be integrated onto the main board. The structure and operation of control circuit 54 and the main printed circuit board is described in U.S. application Ser. No. 09/146,596.

Autopilot circuitry 52 includes an autopilot interface 60 and a NEMA translator 62. Autopilot circuitry 52 is located on a circuit board within Robertson autopilot 32.

Joystick circuitry So connects to autopilot circuitry 52 via two NEMA cables 64a, 64b. NEMA cables 64a, 64b transmit NEMA command sentences between translator 58 and translator 62. Control circuit 54 and autopilot 32 also separately connect by electronic cabling 66a, 66b to a hydraulic steering pump 68, which steers the nozzle.

The manner in which control circuit 54 and autopilot 32 negotiate control over pump 68 is described below.

Steering a Boat Using the Joystick and Integrated Autopilot

A boat 10 having integrated joystick 30 and autopilot 32 can be controlled as follows. First, an operator turns on the boat's electronics and starts the boat's engine. The operator then places joystick 30 in "docking mode" by choosing docking mode on the mode selection switchpanel (not shown), and engages waterjet drive 12. (The different operating modes for joystick 30 and the mode selection switchpanel are described in U.S. Pat. application Ser. No. 09/146, 596.) When drive 12 is first engaged, bucket 14 is in its neutral position, so that drive 12 does not immediately cause boat 10 to move forward or backward.

Next, the operator turns on autopilot 32 by activating autopilot power switch 37. (Alternatively, autopilot power switch 37 can be left on, so that turning on the boat's electronics automatically powers autopilot 32.) Since joystick 30 is in its neutral position when power switch 37 is activated, autopilot 32 immediately engages, and immediately acts to keep the bow of the boat steady. The operator then releases boat 10 from its dock line. Autopilot 32 continues to keep the bow of the boat from drifting while the operator releases the dock line, and while the boat remains still in its slip (while bucket 14 remains in a neutral position).

After releasing boat 10 from its dock, the operator centers the boat within its slip by engaging bowthruster 16. Engaging bowthruster 16 at very low speeds allows direct sideways maneuvering of boat 10, as described below. Once the boat is centered, the operator uses joystick 30 to lower bucket 14, causing boat 10 to move out of its slip.

After leaving the slip, the operator can change the boat's heading by twisting joystick 30. When the operator twists joystick 30, translator 59 translates the twisting movement into an electrical command and sends it to control circuit 54. Control circuit 54 then issues a command sentence instructing autopilot 32 to release control of steering pump 68. The command sentence issued by control circuit 54 travels through interface 56 to translator 58, where it is translated into NEMA. The command then travels over NEMA cable 64a to translator 62, which translates the command into language understood by autopilot 32.

When autopilot 32 receives the command via interface 60, it sends an acknowledgement sentence back toward control circuit 54. The acknowledgement sentence travels through interface 60, is translated into NEMA by translator 62, and travels over cable 64b to translator 58. Translator 58 then translates the acknowledgement into language understood by control circuit 54. Control circuit 54 then receives the acknowledgement via interface 56, and takes control of hydraulic steering pump 68. Joystick 30 now controls movement of hydraulic steering pump 68 and nozzle 18.

Once the operator has adjusted the course of boat 10 to a new desired heading, he or she releases joystick 30, and the centering torque returns joystick 30 to its neutral, "un-torqued" position. As joystick 30 returns to its neutral position, nozzle 18 returns to its centered position (shown in FIGS. 3B and 3E).

The centering movement of joystick 30 is translated by translator 59 into an electrical signal, and sent to control circuit 54. After a predetermined delay, e.g., about 1.5 seconds (long enough to allow nozzle 18 to recenter), control circuit 54 sends a command to autopilot 32 to resume control of steering pump 68. The command sentence travels to autopilot 32 in the manner described above. When autopilot 32 receives the command, it retakes control of steering pump 68, and sends an acknowledgement sentence back to control circuit 54. Autopilot 32 then maintains the current heading of boat 10 until the operator again twists the nozzle.

At any time, the operator can adjust the speed of boat 10 by raising or lowering bucket 14 using joystick 30. Since bucket 14 is not integrated with autopilot 32, the operator can adjust the speed without interfering with the autopilot-based steering. Autopilot 32 also acts to keep the bow of the boat pointed in a desired direction when bucket 14 is in the position shown in FIG. 2C, and boat 10 is moving in reverse.

The autopilot-based steering method can be used throughout the boat's journey, from the moment autopilot power switch 37 is activated until after boat 10 has been re-secured to its dock. The autopilot's power need not be deactivated until after the boat has been re-secured to its dock line.

The operator can use the above described steering method at high speed, low speed, and very low speed, e.g., when maneuvering or docking the boat. To facilitate use of the integrated joystick/autopilot steering method at a variety of speeds, the response sensitivity of autopilot 32 varies depending on the speed of boat 10.

Response sensitivity of an autopilot is measured by its "P-factor," where the P-factor equals the number of degrees the nozzle will rotate to correct for a one degree error in course heading. For example, if compass 34 in autopilot 32 senses that the boat's heading is off by 2°, and the P factor is 3, then autopilot 32 will cause nozzle 18 to rotate 6°. A standard Robertson autopilot has a programmable P factor that shifts between a low-speed P factor and a high-speed P factor based on input from a boat speed sensor; the low and high-speed P factors can be adjusted within a range of 0 to 4.

The modified Robertson autopilot 32 has an extended P-factor range, e.g., from 0 to about 7, and the P-factor varies depending on the speed of the boat. In a preferred embodiment, autopilot 32 operates at one of three different predetermined P-factor response modes. When boat 10 is moving at high speed (forward speed greater than, e.g., about 8 knots), autopilot 32 operates in "high speed mode", and the P factor is, e.g., about 2; when boat 10 is moving at low speed (forward speed of, e.g., about 2 to 8 knots), autopilot 32 operates in "low speed mode," and the P factor is, e.g., about 4; and when boat 10 is moving at a very low speed, e.g., 4, 3, or 2 knots, autopilot 32 operates in "maneuvering mode," and the P-factor is generally greater than 4, e.g., about 5, 6, or 7.

Maneuvering mode is typically used when docking a boat, maneuvering a boat within its slip, or maneuvering a boat through a series of close obstacles. Maneuvering mode is triggered by activating bowthruster 16 with sideways movement of joystick 30 (in the direction of arrows L or R in FIG. 4A). When bowthruster 16 is released, the response mode changes from maneuvering mode back to low speed mode after a predetermined delay of, e.g., about 1.5 seconds.

Alternatively, joystick 30 and autopilot 32 can have greater or less than three possible P-factors, or can have a sliding P-factor scale directly correlated to the speed of boat 10.

Maneuvering a Waterjet Boat in Maneuvering Mode

The highly sensitive maneuvering mode is most useful in waterjet boats. As described above in the Background, steering a waterjet boat, particularly at docking speeds, can be difficult. In prior art boats, an operator would have to simultaneously control the bowthruster, bucket, and nozzle to achieve precision movements, such as direct sideways movement of the boat. By contrast, using the autopilot-based maneuvering mode, an operator can allow the autopilot to keep the bow pointed in a desired direction, simplifying steering.

In maneuvering a boat using bowthruster 16 and autopilot 32, autopilot 32 essentially "chases" the bow. To maneuver boat 10 using the autopilot-based maneuvering mode, an operator first points the bow of the boat in a desired direction by twisting joystick 30, as described above. Next, the operator engages bowthruster 16, shifting the boat to maneuvering mode, and causing the bow of the boat to move sideways. When the bow of boat 10 shifts in response to activation of bowthruster 16, autopilot turns nozzle 18 to compensate, so that the bow of boat 10 continues to point in the desired direction. Autopilot 32, therefore, "chases" the bow, facilitating direct sideways movement of boat 10.

Sideways movements can be combined with forward or reverse movements, as forward or reverse movement of the joystick will produce a corresponding movement of the boat. In short, with the autopilot-based maneuvering system activated, the boat will move in the direction that the operator points the stick, while maintaining the current heading. Should a slight heading adjustment be desired, the operator simply twists the joystick to achieve the new heading, and then continues to point the stick in the direction desired.

The autopilot-based, very low speed maneuvering aspect of the invention is preferably integrated with the autopilot-based steering method described above. That is, autopilot 32 remains engaged at high, low, and maneuvering speeds unless the operator is actively twisting joystick 30. The autopilot-based maneuvering, however, need not be integrated with autopilot-based steering; a waterjet boat that does not have a joystick and does not employ the autopilot-based steering system described above can still employ autopilot-based maneuvering.

Figure 6:
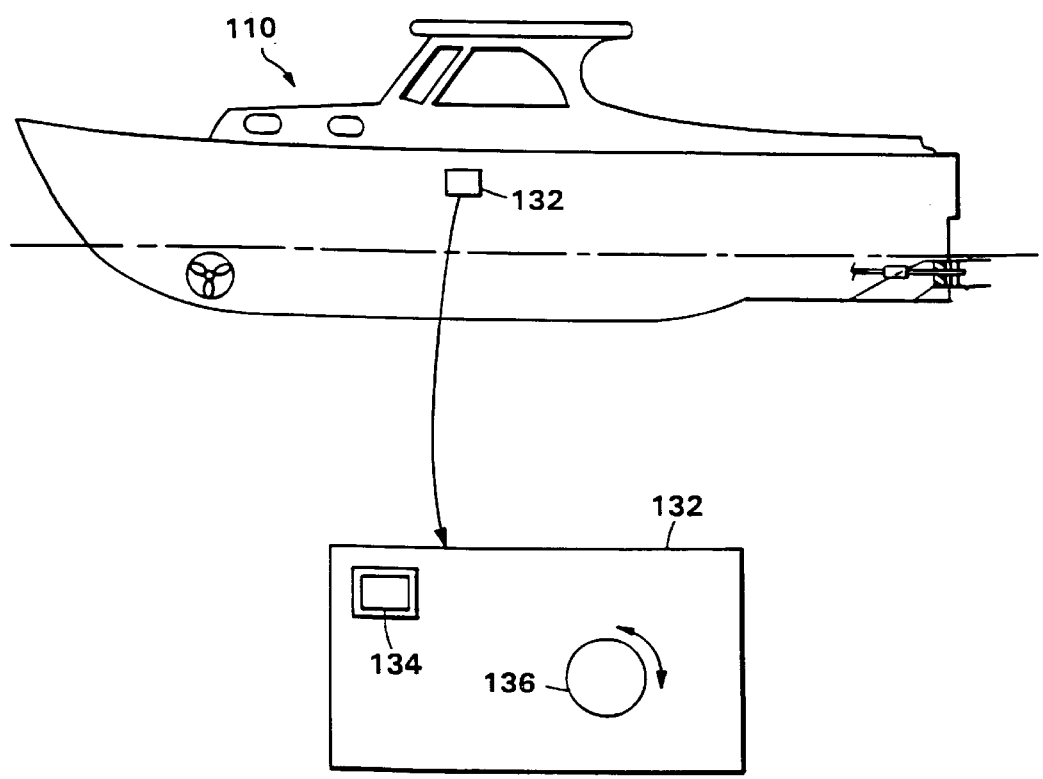
FIG. 6 is a schematic illustrating a waterjet boat equipped with an autopilot.

For example, referring to FIG. 6, a waterjet boat 110 includes an autopilot 132 for low speed maneuvering. Autopilot 132 has a P-factor of, e.g., about 7, and is activated and deactivated by manually pushing a button 134, rather than by releasing a joystick. When autopilot 132 is activated, it keeps the bow of boat 110 pointed in a desired direction, as described above. Autopilot 132 also includes a steering knob 136. The heading of waterjet boat 110 can be adjusted slightly by turning knob 136.

To maneuver boat 110 using autopilot 132, an operator first reduces boat 110's speed to, e.g., one knot, and points the bow of boat 110 in a desired direction. The operator then activates autopilot 132 by pushing button 134, engaging the bucket and bowthruster as needed to maneuver boat 110. If the operator decides to adjust boat 110's heading (adjust the direction the bow is pointing), the operator can turn knob 136.

Other Embodiments

Other embodiments are within the scope of the claims. For example, bowthruster 16 can be integrated into the autopilot-based steering method. Autopilot 32 can be designed to control both bowthruster 16 and nozzle 18 to maintain a heading at low speed. Movement of joystick 30 to engage either nozzle 18 or bowthruster 16 would reclaim control from autopilot 32.

The autopilot-based steering method can be used with steering systems that employ a control device other than a joystick stick control member. And when a stick control member is used, movements other than twisting could be what causes the autopilot to disengage. For example, if the waterjet nozzle is controlled by sideward movement of a joystick rather than by twisting, the autopilot could be automatically disengaged on sensing sideward movement.

The invention described above is particularly useful for small waterjet boats (boats less than 75 feet long), but could also be used in larger waterjet boats.

The autopilot-based steering method of the invention can be used in boats other than waterjet boats. For example, in propeller based boats, an autopilot can be designed to control the boat's course unless an operator is currently commanding a change in course.

What is claimed is:

1. A waterjet boat in which forward and reverse propulsion is provided by one or more jets of water directed generally longitudinally, the boat comprising:

a steering system including at least one nozzle capable of rotation about a generally vertical axis for deflecting at least one jet to impart a side component of force to the stem of the boat and a bow thruster that tends to rotate the boat about a vertical axis and to produce a sideward movement of the bow of the boat;

a joystick device for use by the operator of the boat for manual control of the steering system;

an autopilot configured to be engaged when the boat is moving at a very low speed (less than about 4 knots)

and that controls the steering system to maintain the bow of the boat pointed in a desired direction, wherein the bow thruster is manually controlled by a first movement of the joystick device, wherein the nozzle is manually controlled by a second movement of the joystick device, and wherein forward and aft thrust of the waterjet is manually controlled by a third movement of the joystick device.

2. The boat of claim 1 wherein the joystick device has a stick control member, and the first movement is sideward movement of the stick control member, the second movement is rotation of the stick control member, and the third movement is forward and aft movement of the stick control member.

3. The method of claim 1 wherein the very low speed is about 2 knots.

4. The boat of claim 1 wherein the joystick device has a stick control member that is biased to a neutral position by a centering force.

5. The boat of claim 4 wherein the joystick device has a stick control member capable of rotation and with a neutral zero rotation position, and the stick control member is biased by a centering torque such that it returns to its neutral position when released by the operator.

6. The boat of claim 5 wherein the centering torque that biases the stick control member to its neutral position is provided by a spring.

7. The boat of claim 1 wherein the autopilot also operates when the boat is traveling at higher speeds, which are speeds higher than the very low speed.

8. The boat of claim 1 wherein the joystick device has a stick control member and the stick control member is used to steer the boat at the higher speeds.

9. The boat of claim 8 wherein at the higher speeds the steering system steers the boat towards port or starboard when the stick control member is displaced from its neutral position.

10. The boat of claim 9 wherein the operator is actively commanding the stick control member to change the boat's course when the operator displaces the stick control member from its neutral position.

11. The boat of claim 5 wherein the autopilot is engaged whenever the stick control member is in its neutral position.

* * * * *

UNITED STATES PATENT AND TRADEMARK OFFICE
CERTIFICATE OF CORRECTION

PATENT NO.     : 6,604,479 B2
DATED          : August 12, 2003
INVENTOR(S)    : Shepard W. McKenney and Kenton D. Fadeley It is certified that error appears in the above-identified patent and that said Letters Patent is hereby corrected as shown below:

<u>Column 8,</u>
Line 61, "stem" should be -- stern --.

Signed and Sealed this

Thirtieth Day of March, 2004

JON W. DUDAS
*Acting Director of the United States Patent and Trademark Office*